US008411581B2

(12) United States Patent
Honary et al.

(10) Patent No.: US 8,411,581 B2
(45) Date of Patent: *Apr. 2, 2013

(54) METHOD AND SYSTEM FOR MEDIUM ACCESS CONTROL (MAC) LAYER SPECIALIZATION FOR VOICE AND MULTIMEDIA DATA STREAMS

(75) Inventors: Hooman Honary, Newport Beach, CA (US); Matthew Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1405 days.

This patent is subject to a terminal disclaimer.

(21) Appl. No.: 11/492,381

(22) Filed: Jul. 25, 2006

(65) Prior Publication Data
US 2008/0025210 A1    Jan. 31, 2008

(51) Int. Cl.
    H04L 12/26    (2006.01)
(52) U.S. Cl. .................................. 370/252; 370/465
(58) Field of Classification Search ............... None
    See application file for complete search history.

(56) References Cited

U.S. PATENT DOCUMENTS

| | | | |
|---|---|---|---|
| 6,725,270 B1* | 4/2004 | Yu et al. | 709/229 |
| 6,778,509 B1* | 8/2004 | Ravishankar et al. | 370/322 |
| 7,075,890 B2* | 7/2006 | Ozer et al. | 370/230 |
| 7,542,478 B1* | 6/2009 | Ozer et al. | 370/447 |
| 7,573,820 B2* | 8/2009 | Krishnaswamy et al. | 370/235 |
| 8,031,601 B2* | 10/2011 | Feroz et al. | 370/232 |
| 2004/0030790 A1* | 2/2004 | Le et al. | 709/230 |
| 2005/0036546 A1* | 2/2005 | Rey et al. | 375/240.12 |
| 2005/0144643 A1* | 6/2005 | Hakenberg et al. | 725/86 |
| 2006/0034286 A1* | 2/2006 | Koning et al. | 370/394 |
| 2006/0203729 A1* | 9/2006 | Deshpande | 370/235 |
| 2007/0091900 A1* | 4/2007 | Asthana et al. | 370/395.42 |
| 2008/0192661 A1* | 8/2008 | Hamamoto et al. | 370/310 |
| 2009/0067376 A1* | 3/2009 | Ishii et al. | 370/329 |

FOREIGN PATENT DOCUMENTS

WO    03049449 A2    6/2003

OTHER PUBLICATIONS

Schurgers, C., et al., "Voice Over Wireless Internet: Performance Interaction of Signal Processing Algorithms and Network Protocols," 1999 IEEE 49th Vehicular Technology Conference, vol. 3, pp. 1935-1939.

Pei Y, et al., "Multi-Layered Video Transmission Over Wireless Channels Using an Adaptive Modulation and Coding Scheme," 2001 International Conference on Image Processing, Oct. 7, 2001.

Ghandi et al., "Unequally Error Protected Data Partitioned Video with Combined Hierarchical Modulation and Channel Coding," 2006 IEEE International Conference on Toulouse, May 14, 2006.

Bouabdallah et al., "Dependency-aware Unequal Erasure Protection Codes," Journal of Zhejiang University Science, Jan. 1, 2006.

Albanese et al., "Priority Encoding Transmission," IEEE Transactions on Information Theory, Nov. 1, 1996.

European Search Report: EP07005956 dated Jul. 6, 2012, 9 pages.

* cited by examiner

*Primary Examiner* — Kevin C Harper
*Assistant Examiner* — Rhonda Murphy
(74) *Attorney, Agent, or Firm* — Garlick & Markison (57) ABSTRACT

Aspects of a method and system for medium access control (MAC) layer specialization for voice and multimedia data streams are presented. Aspects of the method include determining a number of attempts for transmitting one or more medium access control (MAC) frames. Aspects of the system may include a processor that enables determination of a number of attempts for transmitting one or more MAC frames. A maximum number for such attempts may be determined based on one or more priority levels associated with different portions of multimedia information being communicated via a wireless medium and contained within the one or more MAC frames.

30 Claims, 8 Drawing Sheets

METHOD AND SYSTEM FOR MEDIUM ACCESS CONTROL (MAC) LAYER SPECIALIZATION FOR VOICE AND MULTIMEDIA DATA STREAMS

CROSS-REFERENCE TO RELATED APPLICATIONS/INCORPORATION BY REFERENCE

This application makes reference to:
U.S. application Ser. No. 11/492,667 filed on even date herewith;
U.S. application Ser. No. 11/492,391 filed on even date herewith;
U.S. application Ser. No. 11/492,721 filed on even date herewith; and
U.S. application Ser. No. 11/492,390 filed on even date herewith.

FIELD OF THE INVENTION

Certain embodiments of the invention relate to data communications. More specifically, certain embodiments of the invention relate to a method and system for medium access control (MAC) layer specialization for voice and multimedia data streams.

BACKGROUND OF THE INVENTION

A network may comprise a plurality of communications media and communications devices that facilitate the transfer of information between a transmitting terminal and at least one receiving terminal. Information may be transmitted via a network in messages, packets, and/or frames. Various communication protocols may be utilized to facilitate the transfer of information in a network. Some transport layer data protocols may control the amount of information that may be transmitted during a time interval. The transmission control protocol (TCP) may be considered to be an example of one such protocol. The TCP may limit the amount of information that is transmitted during a time interval based on a congestion window and slow start. At the beginning of transmission of an information flow, the congestion window may be set to an initial value. This may result in a relatively small amount of information being transmitted from a transmitting terminal to a receiving terminal. The receiving terminal may subsequently communicate an acknowledgement upon receipt of the information that was transmitted by the transmitting terminal.

Upon receipt of the acknowledgement, the transmitting terminal may increase the value associated with the congestion window to a number larger than the initial value, and transmit subsequent information based on the larger value that is associated with the congestion window. This may result in a larger amount of information being transmitted than during a comparable time interval in which the value associated with the congestion window is smaller. The size of the congestion window may increase with the increase in the value associated with the congestion window. A larger congestion window may also result in a higher information transfer rate between the transmitting terminal and the receiving terminal. The receiving terminal may communicate subsequent acknowledgements upon receipt of subsequent information. The transmitting terminal may continue to increase the size of the congestion window upon receipt of a subsequent acknowledgement.

In an instance in which the transmitting terminal does not receive a corresponding acknowledgement to previously transmitted information, the transmitting terminal may determine that the receiving terminal did not receive the previously transmitted information. The transmitting terminal may retransmit, or resend, previously transmitted information for which a corresponding acknowledgement was not received. In addition, the transmitting terminal may determine that congestion may exist in the network resulting in the previously transmitted information not being received by the receiving terminal. The previously transmitted information may be considered by the transmitting terminal to be "lost" in the network. In response to a determination of congestion in the network, or network congestion, the transmitting terminal may also reduce the size of the congestion window. The reduction in the size of the congestion window may result in a reduction in the information transfer rate between the transmitting terminal and the receiving terminal. Once reduced, the size of the congestion window may subsequently begin to increase once again. Thus, a slow start recovery may be initiated at the transmitting terminal.

In some wireless communications networks, fading conditions within the wireless communications medium, and not congestion within the network, may result in transmitted information not being received by the receiving terminal. The fading conditions may be temporary, thus it may be undesirable for a transmitting terminal to enter a slow start state as a result of a temporary loss of data due to fading conditions within the wireless communications medium. In some systems, TCP may be utilized for the transmission of multimedia information, comprising voice, video, and/or data. The real time nature of multimedia information may make it undesirable for the transmitting terminal to enter a slow start state.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for medium access control (MAC) layer specialization for voice and multimedia data streams, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for medium access control (MAC) layer specialization for voice and multimedia data streams. Aspects of the method comprise determining a number of attempts for transmitting one or more MAC frames. Aspects of the system may comprise a processor that enables determination of a number of attempts for transmitting one or more MAC frames. A maximum number for such attempts may be determined based on one or more priority levels associated with different portions of multimedia information being communicated via a wireless medium and contained within the one or more MAC frames.

Figure 1:
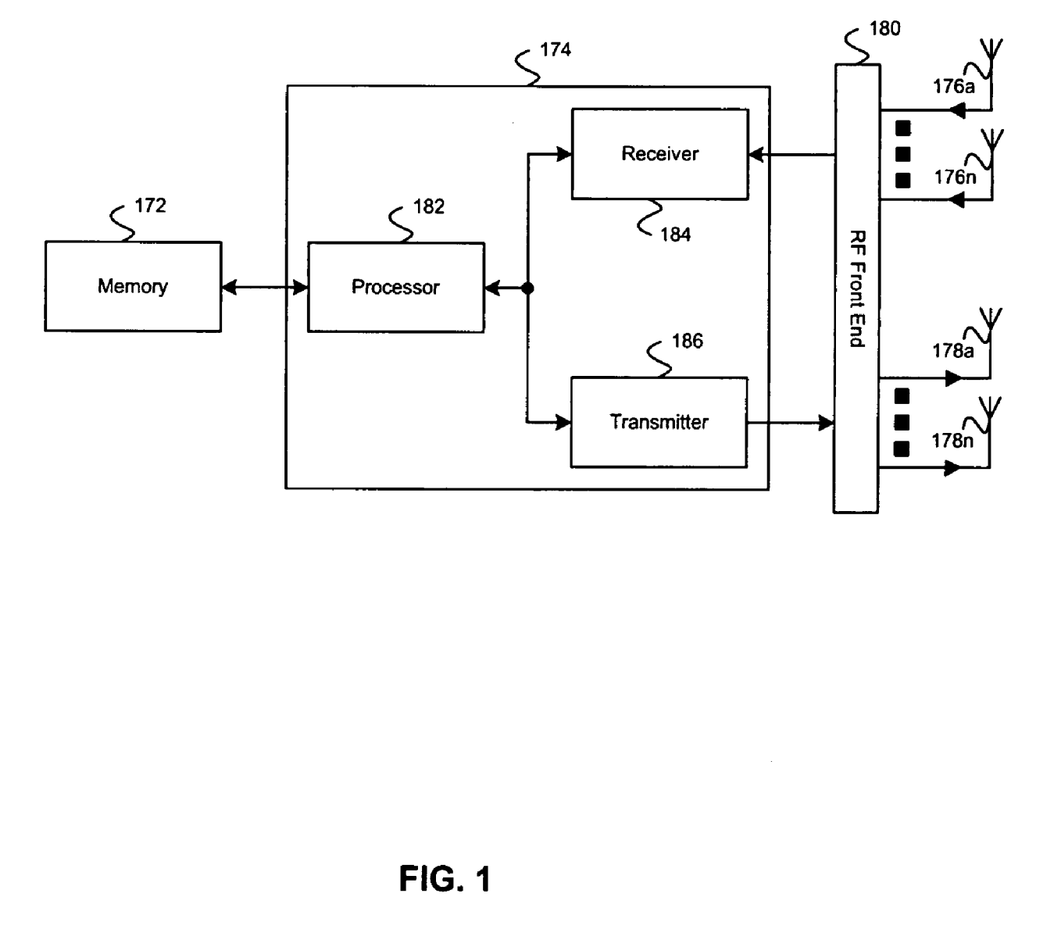
FIG. 1 is a block diagram of exemplary communications circuitry that may be utilized in connection with an embodiment of the invention.

FIG. 1 is a block diagram of exemplary communications circuitry that may be utilized in connection with an embodiment of the invention. With reference to FIG. 1, there is shown a memory processor 172, a transceiver 174, an RF front end 180, a plurality of receive antennas 176a, . . . , 176n, and a plurality of transmitting antennas 178a, . . . , 178n. The transceiver 174 may comprise a processor 182, a receiver 184, and a transmitter 186.

The memory 172 may enable storage and/or retrieval of information that may be transmitted via one or more transmitting antennas 178a, . . . , 178n, received via one or more receive antennas 176a, . . . , 176n, and/or storage of code that may enable control of the operation of the transceiver 174.

The processor 182 may enable digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions.

The receiver 184 may be enable digital receiver functions that may comprise, but are not limited to, fast Fourier transform processing, beamforming processing, equalization, demapping, demodulation control, deinterleaving, depuncture, and decoding. The transmitter 186 may enable digital transmitter functions that comprise, but are not limited to, coding, puncture, interleaving, mapping, modulation control, inverse fast Fourier transform processing, beamforming processing. The RF front end 180 may enable reception of analog RF signals via antennas 176a, . . . , 176n, converting the RF signal to baseband, and generating digital representations of the received analog baseband signals. The digital representation may be a complex quantity comprising I and Q components. The RF front end 180 may also transmit analog RF signals via an antenna 178a, . . . , 178n, converting a digital baseband signal to an analog RF signal.

In operation, the processor 182 may receive data from the receiver 184. The processor 182 may store received data to the memory 172 for subsequent analysis and/or processing. The processor 182 may retrieve information from the memory 172. The retrieved information may be transmitted via an RF channel by the transmitter 186. The processor 182 may associate one or more priority classes to the retrieved information. The transmitter 186 may process and transmit the information via the RF channel based on the corresponding priority classes.

Figure 2:
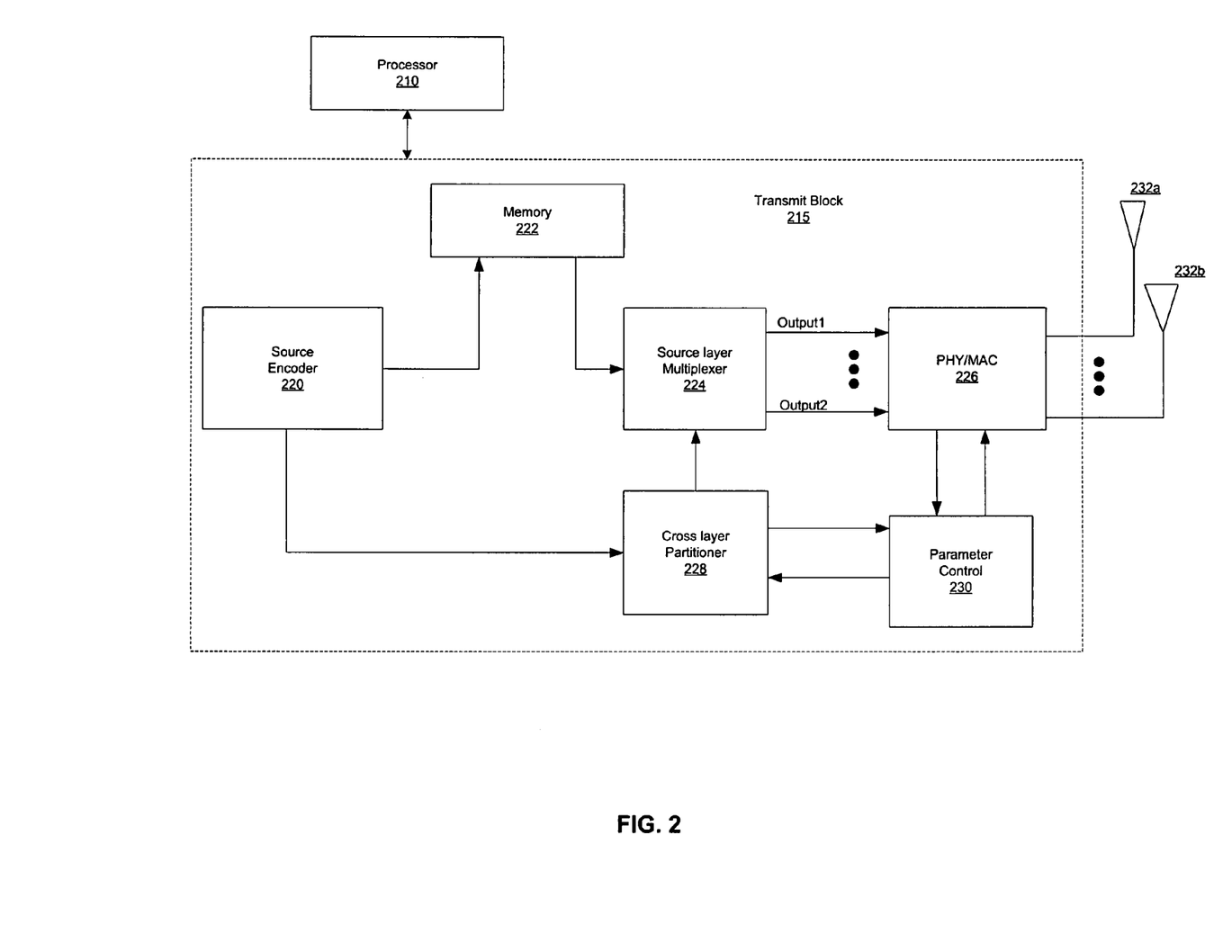
FIG. 2 illustrates an exemplary architecture for source layer optimization for transmitting data, in accordance with an embodiment of the invention.

FIG. 2 illustrates an exemplary architecture for source layer optimization for transmitting data, in accordance with an embodiment of the invention. Referring to FIG. 2, there is shown a processor 210 and a transmit block 215. The transmit block 215 may comprise a source encoder block 220, a memory block 222, a source layer multiplexer block 224, a PHY/MAC block 226, a cross-layer partitioner block 228, a parameter control block 230, and transmit antennas 232a, . . . , 232b.

The source encoder block 220 may comprise suitable logic, circuitry, and/or code that may be utilized to enable compression of data prior to transmission. For example, the compressed data may be video data in MPEG-4 format. The source encoder block 220 may also communicate information about the compressed data to the cross-layer partitioner block 228. The information communicated may relate to the type of compression. For example, if the compressed data comprises video data, the source encoder block 220 may communicate the specific type of compression, such as MPEG-1, MPEG-2, MPEG-4, H.261, H.263, or H.264. The source encoder block 220 may also communicate the type of chroma subsampling used, such as, for example, 4-4-4, 4-2-2, or 4-2-0 chroma subsampling.

The source layer multiplexer block 224 may comprise suitable logic, circuitry, and/or code that may be utilized to enable reading data from, for example, the memory block 222 and communicating various portions of the data to the PHY/MAC 226. The data may be split into the various portions according to information from the cross-layer partitioner block 228. The information from the cross-layer partitioner block 228 may comprise, for example, priority for the various portions of the data. The cross-layer partitioner block 228 may also indicate that portions of data with certain priority may be communicated via certain outputs of the source layer multiplexer block 224.

The PHY/MAC block 226 may comprise suitable logic, circuitry, and/or code that may be utilized to enable conversion of input data in a digital format to output suitably modulated analog data ready for transmission. For example, the PHY/MAC block 226 may apply a FEC code to the digital data. The PHY/MAC block 226 may also apply a specific RF modulation to the analog signal, which may have been converted from the digital data. The PHY/MAC block 226 may additionally communicate analog signals to different transmit antennas 232a, . . . , 232b, in a part of a multiple-input multiple-output (MIMO) architecture.

In an embodiment of the invention, the PHY/MAC block 226 may receive one or more streams of digital data. The PHY/MAC block 226 may then operate on the multiple streams as indicated by, for example, the parameter control block 230. Accordingly, the PHY/MAC block 226 may, for example, apply a specific FEC code to each digital stream. Each digital stream may then be converted to analog RF signal, which may be modulated by a specific RF modulation scheme. Each modulated RF signal may then be communicated to one or more antennas to be transmitted.

The cross-layer partitioner block 228 may comprise suitable logic, circuitry, and/or code that may be utilized to enable assigning a priority to portions of data in the memory block 222. The priority may be based on, for example, perceived importance of the information in the memory block 222. For example, if the data in the memory block 222 comprises video data relating to video frames, a portion of the data that comprises information about an entire frame, such as, example, an I-frame, may have a high priority. Other frames, such as, for example, P-frames may have a lower priority than I-frames since P-frames may depend on the I-frames for additional information. P-frames that depend on other primary P-frames may be, for example, assigned a lower priority than the P-frames that may only depend on I-frames. A B-frame that depends on a prior and a subsequent frame may be assigned, for example, a lowest priority. The number of priorities may be design and/or implementation dependent.

The cross-layer partitioner block 228 may also indicate to the source layer multiplexer block 224 that data with certain priorities may be communicated to the PHY/MAC block 226 via specific outputs of the source layer multiplexer block 224. The cross-layer partitioner block 228 may then communicate to the parameter control block 230 those operations that may be performed on the various streams of data communicated by the source layer multiplexer 224.

Specific streams of data may be communicated to specific transmit antennas. The cross-layer partitioner block 228 may have information regarding the propagation path from each transmit antenna 232a, . . . , 232b to a receive antenna, where data transmitted via one transmit antenna may be received with fewer bit errors, for example, than data transmitted by another transmit antenna. Accordingly, this information may be used to determine which data may be transmitted via which transmit antenna. The information regarding the propagation path for each transmit antenna may be generated, for example, from feedback information from the receiving devices. Alternatively, the information may be generated from feedback information from a receiver co-located with the transmit block 215. The information may be utilized for a method of MIMO transmission referred to as beamforming.

U.S. patent application Ser. No. 11/492,721 filed on even date herewith, provides further information on beamforming, which is incorporated herein by reference in its entirety.

The parameter control block 230 may comprise suitable logic, circuitry, and/or code that may be utilized to enable controlling of various operations to the digital data in the PHY/MAC block 226. For example, the parameter control block 230 may determine the FEC code and/or the RF modulation that may be used by the PHY/MAC block 226 for specific portions of data. The parameter control block 230 may also determine which antennas may be used to transmit which portions of data by controlling routing of the data within the PHY/MAC block 226 to the specific antennas.

However, there may be other embodiments of the invention that route signals to specific antennas using other methods. For example, some embodiments of the invention may select the antenna used to transmit data by selecting the source layer multiplexer 224 output used to communicate data from the source layer multiplexer 224 to the PHY/MAC 226. Data communicated to the PHY/MAC 226 via specific outputs to the PHY/MAC 226 may be transmitted via specific transmit antennas. For example, the data, Output1, may be transmitted by the transmit antenna 232a, and the data, Output2, may be transmitted by the transmit antenna 232b.

In operation, the source encoder block 220 may compress data and store the compressed data in the memory block 222. For simplicity, the data may be assumed to be video data compressed using the MPEG-4 format, two priority levels may be used—a high priority level and a low priority level, and Output1 data and Output2 data may be transmitted by the transmit antennas 232a and 232b, respectively. The source encoder block 220 may communicate to the cross layer partitioner block 228 that the compressed data is video data using the MPEG-4 format. The source encoder block 220 may also communicate, for example, start and end memory addresses for the stored video data corresponding to a frame, the frame number, and the type of frame that may be stored. The type of frame may be, for example, I-frame, P-frame, and B-frame. Other information may also be communicated, such as, for example, the chroma sub-sampling format.

The cross layer partitioner block 228 may then determine a priority to assign to each frame. An exemplary priority level algorithm may assign a high priority for all I-frames and a low priority for all other frames. The priority for the video data in the memory block 222 may be communicated to the source layer multiplexer block 224. The source layer multiplexer 224 may read data from the memory block 222, and may output, for example, high priority data as Output1 and the low priority data as Output2.

The cross layer partitioner block 228 may also communicate to the parameter control block 230 the operations to be applied to each stream of data, namely, Output1 and Output2. For example, the parameter control block 230 may indicate that the high priority data, Output1, may have applied to it a forward error correction (FEC) code A that may have a greater overhead in the number of bits used than a FEC code B. However, using the FEC code A may allow a receiving unit to correct a larger number of faulty bits than when using the FEC code B.

The cross layer partitioner block 228 may also communicate to the parameter control block 230 to use, for example, quadrature phase shift keying (QPSK) RF modulation rather than 16 quadrature amplitude modulation (16 QAM) RF modulation for the high priority data Output1. The QPSK RF modulation may have a smaller data throughput than the 16 QAM RF modulation, however, the QPSK RF modulation may be more reliable for a given transmission environment. Additionally, the transmit antenna 232a may exhibit more reliable transmission characteristics than the transit antenna 232b. If the transmission environment changes such that the transmit antenna 232b exhibits a more reliable transmission characteristics than the transmit antenna 232a, then the cross layer partitioner block 228 may indicate that the higher priority data be output as Output2.

The cross layer partitioner block 228 may also take in to account feedback information from the receiving device to maximize throughput for transmission of the high priority and low priority data. This may allow, for example, the cross layer partitioner block 228 to select from a plurality of FEC codes and from a plurality of RF modulation schemes for a plurality of priority levels. Similarly, MIMO transmission may utilize beamforming, in which one antenna may be selected for transmission of particular stream of data, or a plurality of antennas may be selected for transmission of a particular stream of data.

Although feedback information from a receiving device may be used for transmission, the invention need not be so limited. For example, feedback data from a receiver that is co-located with the transmitting device may also be used. Accordingly, for example, the processor 210 may communicate the feedback data and/or instructions to the transmit block 215. For example, the processor 210 may process the feedback data from a co-located receiving device, and communicate information to the transmit block 215. The information may be used, for example, to control the operations on the data streams by the PHY/MAC block 226.

U.S. application Ser. No. 11/327,690 filed Jan. 6, 2006, provides a detailed description of beamforming, and feedback in a MIMO system, which is hereby incorporated herein by reference in its entirety.

Although an embodiment of the invention may have been described using a plurality of functional blocks, the invention need not be so limited. Accordingly, other embodiments of the invention may use different blocks that may encompass various functionalities.

Figure 3:
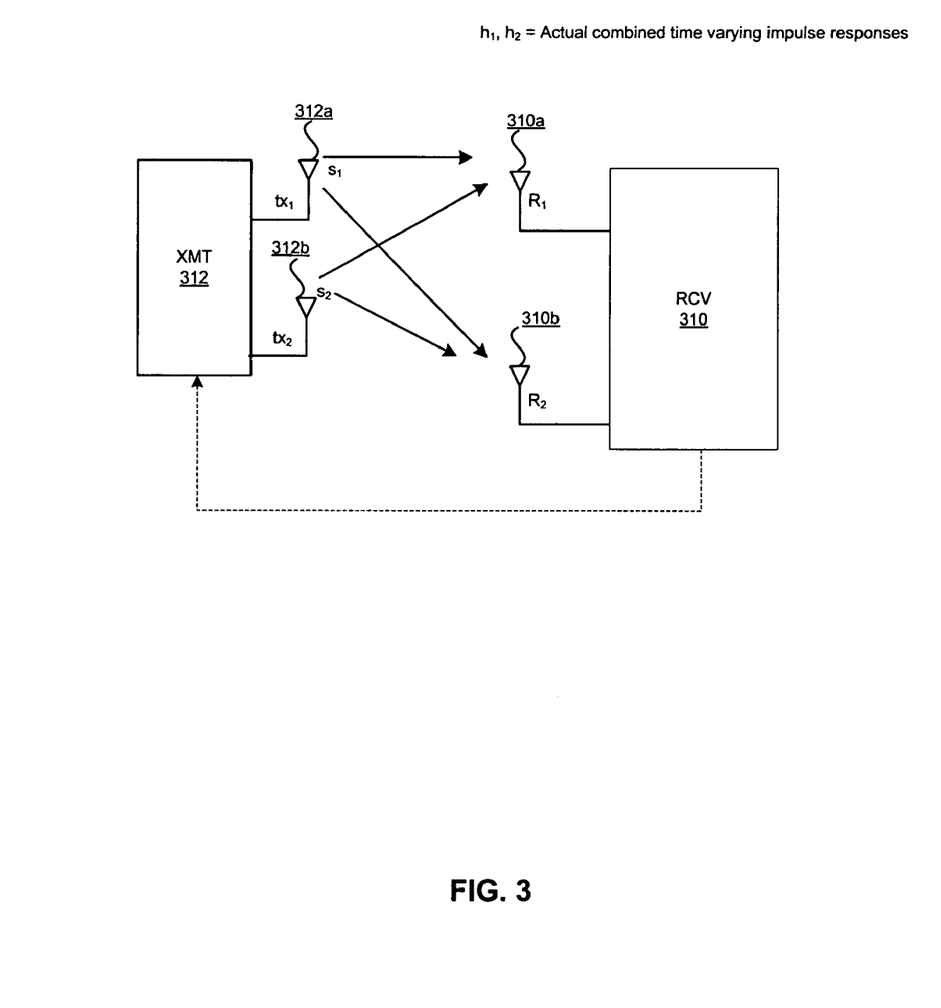
FIG. 3 illustrates an exemplary MIMO architecture with feedback from a receiver to a transmitter, in accordance with an embodiment of the invention.

FIG. 3 illustrates an exemplary MIMO architecture with feedback from a receiver to a transmitter, in accordance with an embodiment of the invention. Referring to FIG. 3, there is shown the transmitting terminal 312 and the receiving terminal 310, which may receive the data transmitted by the transmitting terminal 312. The transmitting terminal 312 may transmit signals via the transmit antennas 312a and 312b, and the receiving terminal may receive signals via the antennas 310a and 310b. The transmitting terminal 312 may generate the RF signals $tx_1$ and $tx_2$, which may be transmitted via the transmit antennas 312a and 312b, respectively. The transmitted RF signals may be represented by s1 and s2. The signals received by the receive antennas 310a and 310b may be represented by R1 and R2, respectively.

In operation, a receive antenna, for example, the receive antenna 310a, may receive signals from a plurality of transmit antennas, for example, the transmit antennas 312a and 312b. In some instances, the transmit antennas 312a and 312b may transmit the same data. In other instances, the transmit antennas 312a and 312b may transmit different data. The receiving terminal 310 may process the received signals R1 and R2 to estimate what information may have been transmitted by the transmitting terminal 312. The receiving terminal 310 may also generate various signal metrics such as, for example, the SNR and bit error rate. The signal metrics may be fed back to the transmitting terminal 312.

For example, the transmitting terminal 312 may transmit different data via the transmit antennas 312a and 312b. The receiving terminal 310 may also process the received signal R1 for the data transmitted by the transmit antenna 312a, and the received signal R2 for the data transmitted by the transmit antenna 312b. Accordingly, if the bit error rate for the received signal R1 is less than the bit error rate for the received signal R2, this information may be fed back to the transmitting station 312. The transmitting station 312 may then assign, for example, the transmit antenna R1 for the high priority data and the transmit antenna R2 for the low priority data. Similarly, the bit error rate and other metrics fed back to the transmitting terminal 312 may be used by the transmitting terminal 312 to select, for example, different FEC codes and/or RF modulation schemes.

Figure 4:
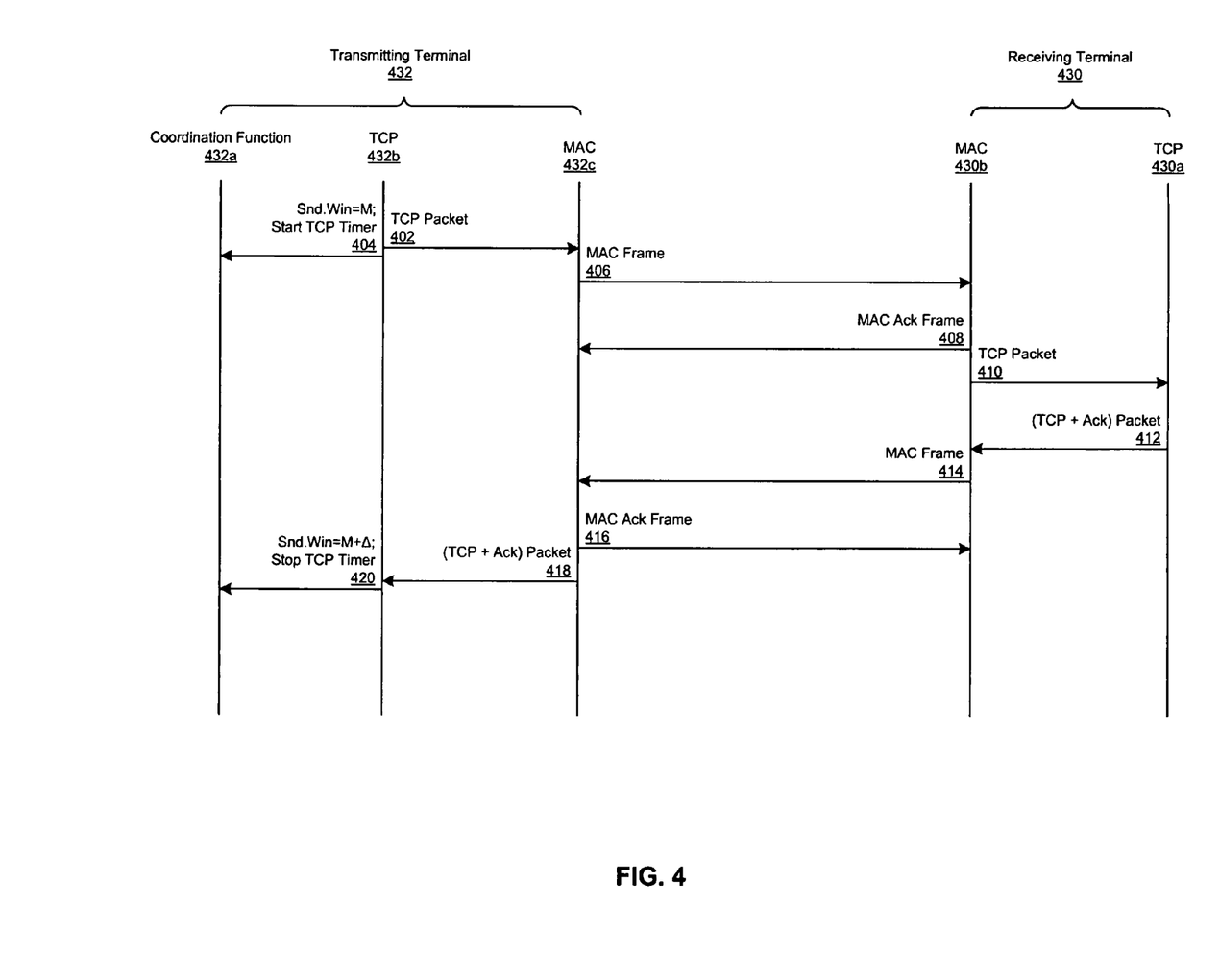
FIG. 4 is an exemplary flowchart illustrating message exchanges in a successful TCP communication, which may be utilized in connection with an embodiment of the invention.

FIG. 4 is an exemplary flowchart illustrating message exchanges in a successful TCP communication, which may be utilized in connection with an embodiment of the invention. Referring to FIG. 4, there is shown a transmitting terminal 432 and a receiving terminal 430. The transmitting terminal may comprise a plurality of communication entities comprising a coordination function 432a, a TCP entity 432b, and a MAC entity 432c. The receiving terminal may comprise a plurality of communication entities comprising a TCP entity 430a, and a MAC entity 430b.

FIG. 4 illustrates an exemplary exchange of messages from a TCP entity 432b in a transmitting terminal 432 and a corresponding TCP entity 430a in a receiving terminal 430. The messages may be utilized to communicate multimedia information, which may comprise voice, video and/or data information, for example. The messages may comprise TCP packets, and MAC frames, for example. A MAC frame may comprise a TCP packet by encapsulating the TCP packet, for example.

A MAC frame may be defined in various IEEE 802 documents and standards, for example. A TCP packet may be defined in various Internet Engineering Task Force (IETF) request for comments (RFC) documents and standards such as RFC 793, for example.

In step 402, the TCP entity 432b may communicate a TCP packet 402 to the MAC entity 432c. In step 404, the TCP entity 432b may communicate information to the coordination function 432a. The communicated information may comprise an indication of the TCP window size utilized by the transmitting terminal 432 for transmitting information to the receiving terminal 430, Snd.Win=M. M may indicate an amount of data, as measured in octets, for example. The variable M may represent a number whose value is greater than 1, for example. The communicated information may also comprise a start TCP timer indication. The TCP timer indication may indicate a start time for a time duration within which an acknowledgement is expected from the receiving terminal 430. Failure to receive an acknowledgement within the time duration may result in the TCP entity 432b reaching a TCP timeout time instant, and subsequently entering a slow start state in its communications with the corresponding TCP entity 430a. Prior to reaching the TCP timeout time instant, the TCP entity 432b may attempt to retransmit the TCP packet (step 402) one or more times.

In step 406, the MAC entity 432c may encapsulate the TCP packet (step 402) and communicate a MAC frame to the MAC entity 430b. In step 408, the MAC entity 430b may communicate a MAC acknowledgement frame to the MAC entity 432c. Receipt of the MAC acknowledgement frame by the MAC entity 432c may indicate that the MAC frame (step 406) was successfully received by the MAC entity 430b. In step 410, the MAC entity 430b may communicate a TCP packet to the TCP entity 430a. The TCP packet (step 410) may be derived by de-encapsulation of the received MAC frame (step 406). The TCP packet (step 410) may substantially comprise the information contained in the TCP packet (step 402).

In step 412, the TCP entity 430a may communicate a TCP and acknowledgement packet to the MAC entity 430b. The TCP portion of the packet may comprise information being communicated from the receiving terminal 430 to the transmitting terminal 432, for example, feedback information. The acknowledgement portion of the packet may comprise information that enables the TCP entity 432b to determine that the TCP packet (step 402) was successfully received by the TCP entity 430a. In step 414, the MAC entity 430c may encapsulate the TCP and acknowledgement packet (step 412) and communicate a MAC frame to the MAC entity 432b. In step 416, the MAC entity 432b may communicate a MAC acknowledgement frame to the MAC entity 430c.

In step 418, the MAC entity 432b may communicate a TCP and acknowledgement packet to the TCP entity 432a. The TCP and acknowledgement packet (step 418) may be derived by de-encapsulation of the received MAC frame (step 414). The TCP and acknowledgement packet (step 418) may substantially comprise the information contained in the TCP and acknowledgement packet (step 412). In step 420, the TCP entity 432b may communicate information to the coordination function 432a. The communicated information may comprise an indication of an updated TCP window size, Snd.Win=M+Δ. The variable Δ may represent a number whose value is greater than or equal to 0, for example. The communicated information may also comprise a stop TCP timer indication. The stop TCP timer indication may indicate that the timer, which was started in anticipation of an acknowledgement for the TCP packet (step 402), has been stopped.

Figure 5:
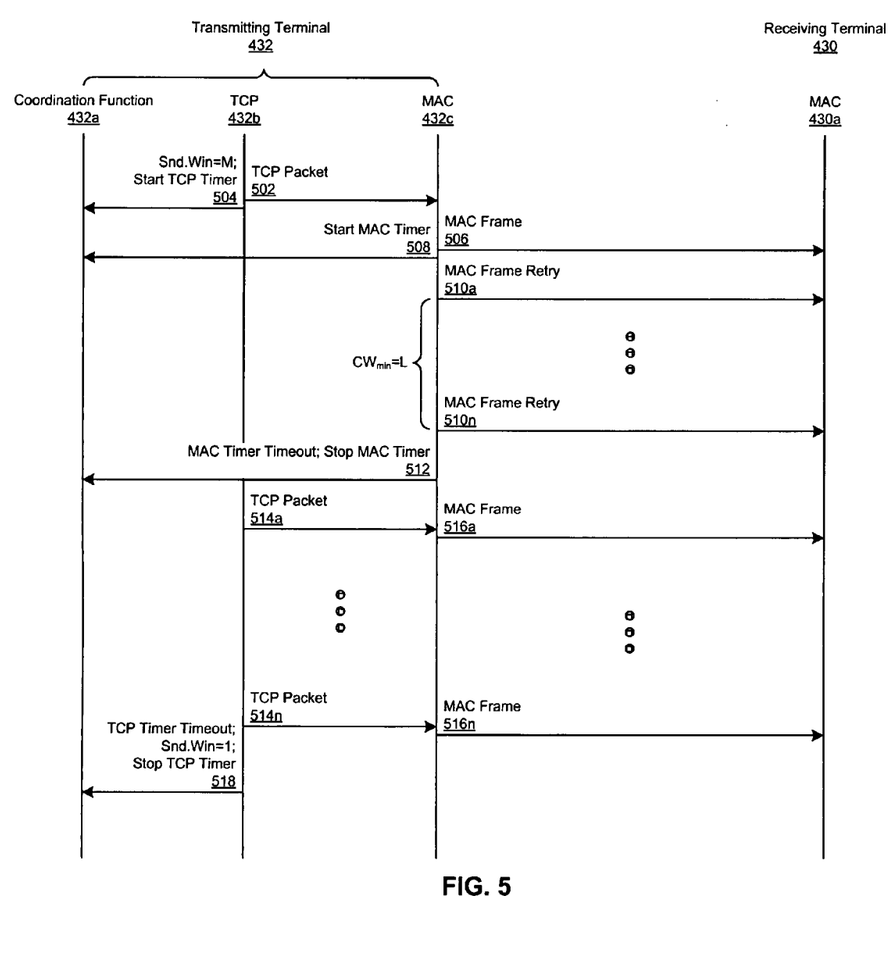
FIG. 5 is an exemplary flowchart illustrating message exchanges in an unsuccessful MAC communication, which may be utilized in connection with an embodiment of the invention.

FIG. 5 is an exemplary flowchart illustrating message exchanges in an unsuccessful MAC communication, which may be utilized in connection with an embodiment of the invention. Referring to FIG. 5, there is shown a transmitting terminal 432 and a receiving terminal 430. The transmitting terminal may comprise a plurality of communication entities comprising a coordination function 432a, a TCP entity 432b, and a MAC entity 432c. The receiving terminal may comprise a plurality of communication entities comprising a MAC entity 430a.

In step 502, the TCP entity 432b may communicate a TCP packet 402 to the MAC entity 432c. In step 504, the TCP entity 432b may communicate information to the coordination function 432a. The communicated information may comprise an indication of the TCP window size, Snd.Win=M. M may indicate an amount of data, as measured in octets, for example. The variable M may represent a number whose value is greater than 1, for example. The communicated information may also comprise a start TCP timer indication. The TCP timer indication may indicate a start time for a time duration within which an acknowledgement is expected from the receiving terminal 430.

In step 506, the MAC entity 432c may encapsulate the TCP packet (step 502) and communicate a MAC frame to the MAC entity 430a. In step 508, the MAC entity 432c may communicate information to the coordination function 432a. The communicated information may comprise a start MAC timer indication. The MAC timer indication may indicate a start time for a time duration within which an acknowledgement is expected from the receiving terminal 430. Failure to receive an acknowledgement within the time duration may result in the MAC entity 432c abandoning attempts to communicate the MAC frame (step 506) to the receiving terminal 430. If the MAC 432c fails to receive an acknowledgement within a retransmit time duration, the MAC 432c may attempt to retransmit the MAC frame. The number of retransmission attempts may be determined by the contention window parameter $CW_{win}$=L. The variable L may represent a number whose value is greater than or equal to 0, for example. The number of retransmission attempts may occur during the time duration associated with the MAC timer (step 508).

In steps 510a, ..., 510n, the MAC entity 432c may perform a plurality of retransmission attempts for the MAC frame (step 506) based on the value for the contention window parameter $CW_{win}$=L. If an acknowledgement is not received in response to the transmitted MAC frame (step 506), or any of the retransmission attempts (steps 510a, ..., 510n), in step 512 the MAC entity 432c may communicate information to the coordination function 432a. The communicated information may also comprise a stop MAC timer indication. The stop MAC timer indication may indicate that a MAC timer timeout has occurred.

In steps 514a, ..., 514n, the TCP entity 432b may perform a plurality of retransmission attempts for the TCP packet (step 502). The plurality of retransmission attempts may occur during the time duration associated with the TCP timer (step 504). In steps 516a, ..., 516n, a plurality of MAC frames may be transmitted in response to the corresponding TCP packet retransmission attempts (514a, ..., 514n).

If an acknowledgement is not received in response to the transmitted TCP packet (step 502), or any of the retransmission attempts (steps 514a, ..., 514n), in step 518 the TCP entity 432b may communicate information to the coordination function 432a. The communicated information may also comprise a stop TCP timer indication. The stop TCP timer indication may indicate that a TCP timer timeout has occurred. The communicated information may also comprise an indication of an updated TCP window size, Snd.Win=1. The updated TCP window size Snd.Win=1 may indicate that the TCP entity 432b has entered a slow start state.

In some conventional systems, the value for the contention window parameter, $CW_{win}$, may be set to the value $CW_{win}$=L without regard for the information content contained within the TCP packet (step 502). Consequently, the number of retransmission attempts by the MAC entity 432c may occur without regard to the information content contained within the MAC frame (step 506).

In various embodiments of the invention, the value for the contention window parameter, $CW_{win}$, may be set based on a priority level associated with the information content contained within the MAC frame. For example, for information content associated with a high priority level, the contention window parameter may be set to a value $CW_{win}=L_{High}$, or for information content associated with a high priority level, the contention window parameter may be set to a value $CW_{win}=L_{Low}$, wherein $L_{High}>L_{Low}$. In addition, the response to a MAC timer timeout may be determined based on the assigned priority level associated with the information content contained within the MAC frame.

Figure 6:
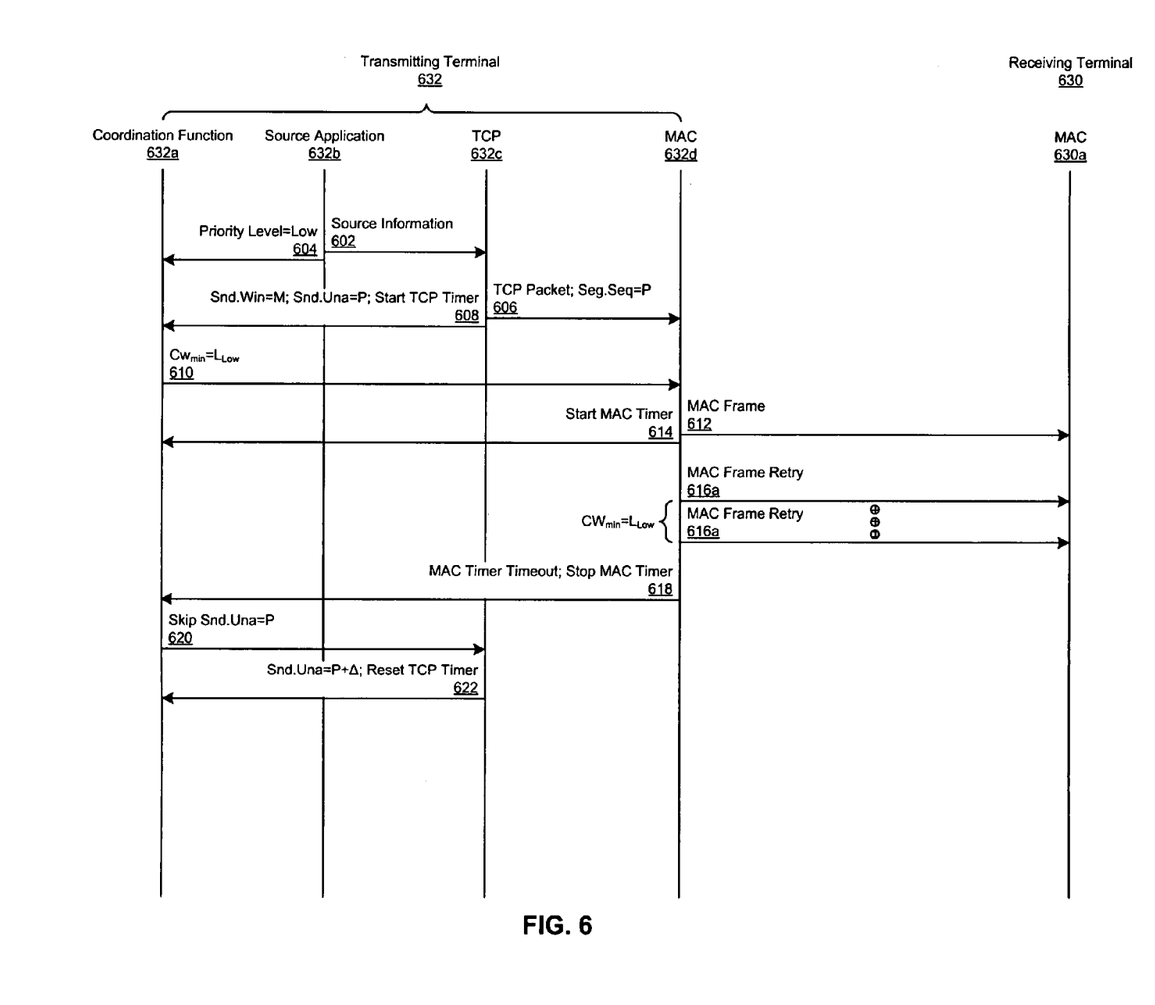
FIG. 6 is an exemplary flowchart illustrating message exchanges in an unsuccessful MAC communication for low priority level information, in accordance with an embodiment of the invention.

FIG. 6 is an exemplary flowchart illustrating message exchanges in an unsuccessful MAC communication for low priority level information, in accordance with an embodiment of the invention. Referring to FIG. 6, there is shown a transmitting terminal 632 and a receiving terminal 630. The transmitting terminal may comprise a plurality of communication entities comprising a coordination function 632a, a source application entity 632b, a TCP entity 632c, and a MAC entity 632d. The receiving terminal may comprise a plurality of communication entities comprising a MAC entity 630a. Exemplary source application entities may comprise MPEG-4 encoders, database programs, and voice over IP (VOIP) encoders.

In step 602, the source application entity 632b may communicate source information to the TCP entity 632c. In step 604, the source application entity 632b may communicate information to the coordination function 632a. The communicated information may comprise an indication for the priority level=Low associated with the source information (step 602). In step 606, the TCP entity 632c may communicate a TCP packet to the MAC entity 632d. The TCP packet may comprise a sequence number associated with the TCP packet as indicated by Seg.Seq=P, where the variable P may represent a sequence number.

In step 608, the TCP entity 632c may communicate information to the coordination function 632a. The communicated information may comprise an indication of the TCP window size, Snd.Win=M. The communicated information may comprise a start TCP timer indication. The communicated information may also comprise an unacknowledged sequence number as indicated by Snd.Una=P. The unacknowledged sequence number may indicate a TCP packet (step 606) that was transmitted by the TCP entity 632c, for which a corresponding acknowledgement has not been received, for example.

In step 610, the coordination function 632a may communicate a value for the contention window parameter $CW_{win}=L_{Low}$, which may be utilized by the MAC entity 632d in connection with a MAC frame that may be transmitted by the MAC entity 632d in response to receipt of the TCP packet (step 606). The value for the contention window parameter $L_{Low}$ may be determined based on the priority class (step 604). In step 612, the MAC entity 632d may encapsulate the TCP packet (step 606) and communicate a MAC frame to the MAC entity 630a. In step 614, the MAC entity 632d may communicate information to the coordination function 632a. The communicated information may comprise a start MAC timer indication.

In steps 616a, . . . , 616n, the MAC entity 632d may perform a plurality of retransmission attempts for the MAC frame (step 612) based on the value for the contention window parameter $CW_{win}=L_{Low}$. If an acknowledgement is not received in response to the transmitted MAC frame (step 612), or any of the retransmission attempts (steps 616a, . . . , 616n), in step 618 the MAC entity 632d may communicate information to the coordination function 632a. The communicated information may also comprise a stop MAC timer indication. The stop MAC timer indication may indicate that a MAC timer timeout has occurred.

In step 620, the coordination function 632a may communicate a halt instruction to the TCP entity 632c in association with the TCP packet (step 606). The TCP packet may be identified based on the unacknowledged sequence number Snd.Una=P (as in step 608). The halt instruction may instruct the TCP entity 632c to suspend attempts to retransmit the unacknowledged TCP packet (step 606). The halt instruction may also instruct the TCP entity 632c to suspend entry into a slow start state if an acknowledgement for the TCP packet (step 606) is not received. In step 622, the TCP entity 632c may communicate information to the coordination function 632a. The communicated information may comprise a reset TCP timer indication. The reset TCP timer indication may indicate that the TCP entity 632c has ceased tracking a TCP timeout condition in connection with the TCP packet (step 606). The TCP timer may continue tracking a TCP timeout condition that may occur in connection with TCP packets that may have been transmitted by the TCP entity 632c subsequent to transmission of the TCP packet (step 606). The communicated information may also comprise an indication of an updated TCP window size, Snd.Win=M+A. The variable A may represent a number whose value is greater than or equal to 0, for example.

Figure 7:
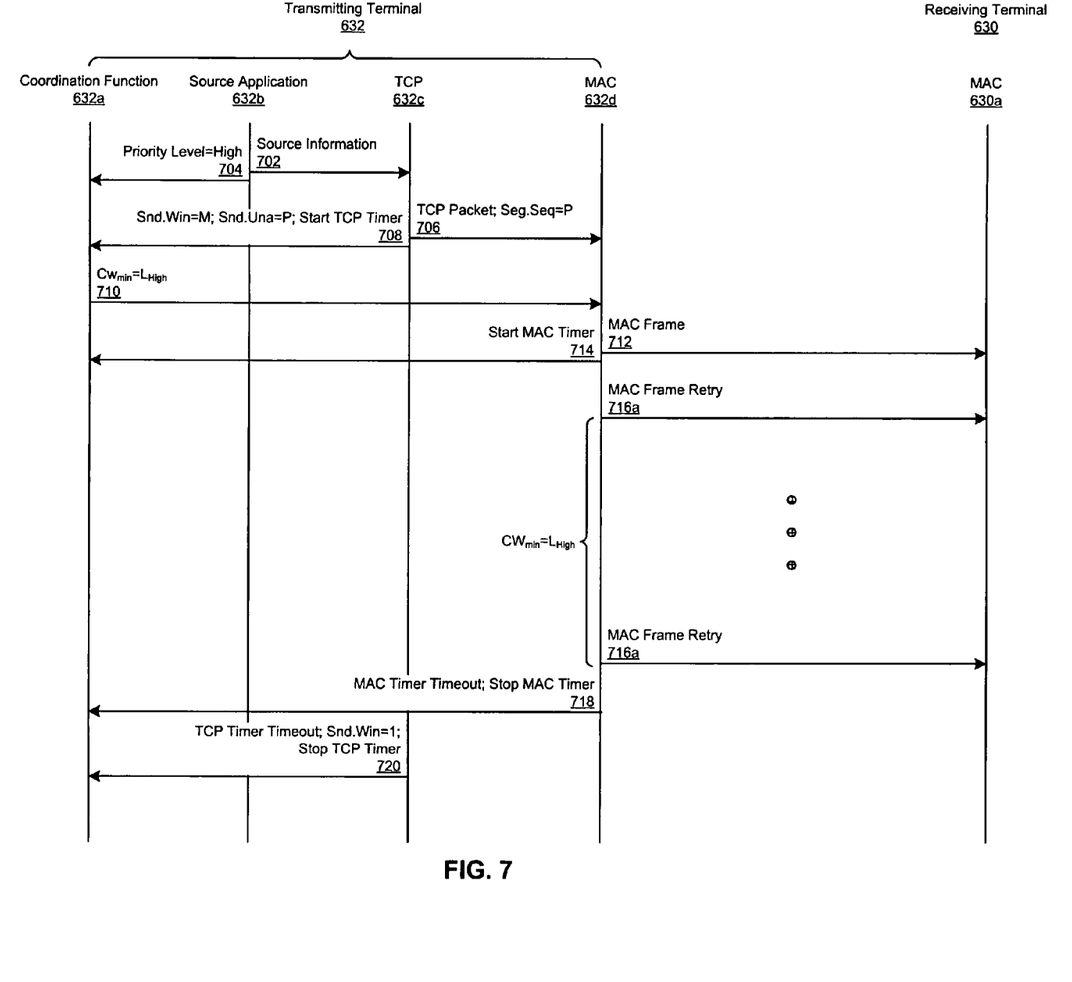
FIG. 7 is an exemplary flowchart illustrating message exchanges in an unsuccessful MAC communication for high priority level information, in accordance with an embodiment of the invention.

FIG. 7 is an exemplary flowchart illustrating message exchanges in an unsuccessful MAC communication for high priority level information, in accordance with an embodiment of the invention. Referring to FIG. 7, there is shown a transmitting terminal 632 and a receiving terminal 630. The transmitting terminal may comprise a plurality of communication entities comprising a coordination function 632a, a source application entity 632b, a TCP entity 632c, and a MAC entity 632d. The receiving terminal may comprise a plurality of communication entities comprising a MAC entity 630a.

In step 702, the source application entity 632b may communicate source information to the TCP entity 632c. In step 704, the source application entity 632b may communicate information to the coordination function 632a. The communicated information may comprise an indication for the priority level=High associated with the source information (step 702). In step 706, the TCP entity 632c may communicate a TCP packet to the MAC entity 632d. The TCP packet may comprise a sequence number associated with the TCP packet as indicated by Seg.Seq=P, where the variable P may represent a sequence number.

In step 708, the TCP entity 632c may communicate information to the coordination function 632a. The communicated information may comprise an indication of the TCP window size, Snd.Win=M. The communicated information may comprise a start TCP timer indication. The communicated information may also comprise an unacknowledged sequence number as indicated by Snd.Una=P. The unacknowledged sequence number may indicate a TCP packet (step 706) that was transmitted by the TCP entity 632c, for which a corresponding acknowledgement has not been received, for example.

In step 710, the coordination function 632a may communicate a value for the contention window parameter $CW_{win}=L_{High}$, which may be utilized by the MAC entity 632d in connection with a MAC frame that may be transmitted by the MAC entity 632d in response to receipt of the TCP packet (step 706). The value for the contention window parameter $L_{High}$ may be determined based on the priority class (step 704). In step 712, the MAC entity 632d may encapsulate the TCP packet (step 706) and communicate a MAC frame to the MAC entity 630a. In step 714, the MAC entity 632d may communicate information to the coordination function 312a. The communicated information may comprise a start MAC timer indication.

In steps 716a, . . . , 716n, the MAC entity 632d may perform a plurality of retransmission attempts for the MAC frame (step 712) based on the value for the contention window parameter $CW_{win}=L_{High}$. If an acknowledgement is not received in response to the transmitted MAC frame (step 712), or any of the retransmission attempts (steps 716a, . . . , 716n), in step 718 the MAC entity 632d may communicate information to the coordination function 632a. The communicated information may also comprise a stop MAC timer indication. The stop MAC timer indication may indicate that a MAC timer timeout has occurred.

The time duration spanning the start MAC timer indication (step 714) and the stop MAC timer indication (step 718) may comprise a substantial portion of the TCP timeout duration, for example. The number of TCP retransmission attempts prior to a TCP timeout, in various embodiments of the invention, may be 0, and/or fewer in number than in some conventional systems as represented in steps 514a, . . . , 514n.

In step 720, the TCP entity 632c may communicate information to the coordination function 632a. The communicated information may also comprise a stop TCP timer indication. The stop TCP timer indication may indicate that a TCP timer timeout has occurred. The communicated information may also comprise an indication of an updated TCP window size, Snd.Win=1. The updated TCP window size Snd.Win=1 may indicate that the TCP entity 632c has entered a slow start state.

Figure 8:
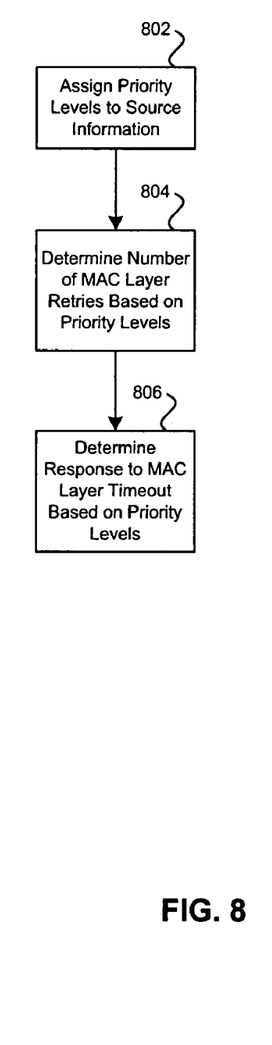
FIG. 8 is an exemplary flowchart illustrating exemplary steps for a system for MAC layer specialization for voice and multimedia data streams, in accordance with an embodiment of the invention.

FIG. 8 is an exemplary flowchart illustrating exemplary steps for a system for MAC layer specialization for voice and multimedia data streams, in accordance with an embodiment of the invention. Referring to FIG. 8, in step 802, priority levels may be assigned to source information. The priority levels may be assigned based on the information content associated with source information. In step 804, a number of MAC layer retransmission attempts associated with a transmitted MAC frame may be determined based on the priority levels. A high priority level may be associated with a value $L_{High}$, while a low priority level may be associated with a value $L_{Low}$, for example. In step 806, a response to a MAC layer timeout condition may be determined based on the priority levels. For example, for high priority level source information, a higher number of MAC layer retransmission attempts, $L_{High}$, may be performed prior to a MAC timer timeout. When a MAC timer timeout occurs, a subsequent TCP timer timeout may occur causing the TCP layer entity to enter a slow start state. For low priority level source information, a lower number of MAC layer retransmission attempts, $L_{Low}$, may be performed prior to a MAC time timeout. When a MAC timer timeout occurs, the coordination function may instruct the TCP layer entity to continue packet processing and not enter a slow start state in response to a failure to receive an acknowledgement from the previously transmitted TCP packet.

In various embodiments of the invention a number of retry attempts by the MAC layer entity 632d may be based on a priority level associated with a video frame type contained with a MAC frame. I frames may carry full image information and may be associated with a high priority level, for example. Consequently, a greater number of MAC layer retry attempts may be performed. B frames may carry sub-picture information and motion vectors. The impact of loss of a B frame for video quality may be less than the impact of loss of an I frame. B frames may be associated with a low priority level, for example. Consequently, a lesser number of MAC layer retry attempts may be performed. If a MAC layer timeout occurs in connection with transmission and/or retransmission of B frame information, the coordination function 632a may communicate an instruction, to the TCP entity 632c, to skip the corresponding TCP packet.

Aspects of a system for medium access control (MAC) layer specialization for voice and multimedia data streams may comprise a processor 210 that enables determination of a number of attempts for transmitting one or more MAC frames based on a corresponding one or more of a plurality of priority levels associated with different portion of multimedia information. The number of attempts may occur within a time duration associated with a transmission control protocol (TCP) packet corresponding to the one or more MAC frames. The TCP packet may be encapsulated by utilizing a corresponding one or more MAC frames. The MAC frames may be transmitted by a transmitting terminal 632 to a receiving terminal 630 via a wireless medium. A maximum number of attempts for transmitting the one or more MAC frames may occur within a timeout period associated with the TCP packet. The timeout period may comprise a time duration within which an acknowledgement in response to transmitting the TCP packet is expected from the receiving terminal 630.

In another aspect of the system, the processor 210 may enable a TCP entity 632c to cease attempts to retransmit a TCP packet subsequent to a time duration associated with the one or more MAC frames based on the one or more of the plurality of priority levels. The time duration may represent a timeout period associated with the MAC frame during which the maximum number of attempts for transmitting the MAC frame may be performed. The processor 210 may instruct the TCP entity 632c to stop a timer associated with the TCP packet. The instruction to stop the timer associated with the TCP packet may be in connection with receipt of a skip instruction from a coordination function 632a. The TCP entity 632c may continue to measure time duration associated with a subsequent TCP packet and/or previous TCP packet. The subsequent TCP packet and/or previous TCP packet may have been transmitted at least once at the time instant in which timer associated with the TCP packet was stopped. The TCP entity 632c may not enter a slow start state based on failure to receive an acknowledgement in response to transmitting and/or retransmitting the TCP packet. The slow start state may be defined based on TCP specifications, for example.

In another aspect of the invention, the processor 210 may enable one or more attempts to retransmit a TCP packet subsequent to a time duration associated with the one or more MAC frames based on the one or more of the plurality of priority levels. The TCP entity 632c may attempt to transmit the TCP packet subsequent to a MAC timeout. The processor 210 may enable entry of a slow start state based on a failure to receive an acknowledgement in response to transmitting and/or retransmitting the TCP packet.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling multimedia information in a communication system having a processor, the method comprising:
   determining a priority level of a transmission control protocol (TCP) packet based on information within said TCP packet;
   determining a retransmission window time duration based on said determined priority level of said TCP packet;
   assigning one or more transmit antennas based on said determined priority level of said TCP packet for transmitting of at least one medium access control (MAC) frame corresponding to said TCP packet;
   transmitting at least one MAC frame corresponding to said TCP packet within said determined retransmission window time duration; and
   when a timeout of a timer associated with said transmitting of said at least one MAC frame occurs at an end of said determined retransmission window time duration, determining whether to retransmit said TCP packet based on said determined priority level of said TCP packet.

2. The method according to claim 1, comprising instructing a transmission control protocol (TCP) entity to cease attempts to retransmit said TCP packet subsequent to said retransmission window time duration associated with said transmitting of said at least one MAC frame based on said priority level of said TCP packet.

3. The method according to claim 2, comprising instructing said TCP entity to stop a timer associated with said TCP packet.

4. The method according to claim 3, wherein said TCP entity continues to measure a time duration corresponding to at least one of the following: a subsequent TCP packet, and a previous TCP packet.

5. The method according to clam 2, wherein said TCP entity does not enter a slow start state based on failure to receive an acknowledgement in response to transmitting or retransmitting said TCP packet.

6. The method according to claim 1, comprising attempting to retransmit said TCP packet subsequent to said retransmission window time duration associated with said transmitting of said at least one MAC frame based on said priority level of said TCP packet.

7. The method according to claim 6, comprising entering a slow start state based on failure to receive an acknowledgement in response to transmitting or retransmitting said TCP packet.

8. The method according to claim 1, comprising retransmitting said at least one MAC frame when an acknowledgment for said transmitting is not received within an acknowledgment time duration following said transmitting.

9. The method according to claim 8, comprising determining a maximum number of attempts for said retransmitting based on said retransmission window time duration.

10. The method according to claim 9, wherein said maximum number of attempts occurs within said retransmission window time duration associated with said transmitting of said at least one MAC frame corresponding to said TCP packet.

11. A non-transitory computer readable storage medium having stored thereon, a computer program having at least one code section for handling multimedia information in a communication system, the at least one code section being executable by a computer for causing the computer to perform steps comprising:
  determining a priority level of a transmission control protocol (TCP) packet based on information within said TCP packet;
  determining a retransmission window time duration based on said determined priority level of said TCP packet;
  assigning one or more transmit antennas based on said determined priority level of said TCP packet for transmitting of at least one medium access control (MAC) frame corresponding to said TCP packet;
  transmitting at least one MAC frame corresponding to said TCP packet within said determined retransmission window time duration; and
  when a timeout of a timer associated with said transmitting of said at least one MAC frame occurs at an end of said determined retransmission window time duration, determining whether to retransmit said TCP packet based on said determined priority level of said TCP packet.

12. The non-transitory computer readable storage medium according to claim 11, wherein said at least one code section comprises code for instructing a TCP entity to cease attempts to retransmit said TCP packet subsequent to said retransmission window time duration associated with said transmitting of said at least one MAC frame based on said priority level of said TCP packet.

13. The non-transitory computer readable storage medium according to claim 12, wherein said at least one code section comprises code for instructing said TCP entity to stop a timer associated with said TCP packet.

14. The non-transitory computer readable storage medium according to claim 13, wherein said TCP entity continues to measure a time duration corresponding to at least one of the following: a subsequent TCP packet, and a previous TCP packet.

15. The non-transitory computer readable storage medium according to clam 12, wherein said TCP entity does not enter a slow start state based on failure to receive an acknowledgement in response to transmitting and or retransmitting said TCP packet.

16. The non-transitory computer readable storage medium according to claim 11, wherein said at least one code section comprises code for attempting to retransmit said TCP packet subsequent to said retransmission window time duration associated with said transmitting of said at least one MAC frame based on said priority level of said TCP packet.

17. The non-transitory computer readable storage medium according to claim 16, wherein said at least one code section comprises code for entering a slow start state based on failure to receive an acknowledgement in response to transmitting or retransmitting said TCP packet.

18. The non-transitory computer readable storage medium according to claim 11, wherein said at least one code section comprises code for retransmitting said at least one MAC frame when an acknowledgment for said transmitting is not received within an acknowledgment time duration following said transmitting.

19. The non-transitory computer readable storage medium according to claim 18, wherein said at least one code section comprises code for determining a maximum number of attempts for said retransmitting based on said retransmission window time duration.

20. The non-transitory computer readable storage medium according to claim 19, wherein said maximum number of attempts occurs within said retransmission window time duration associated with said transmitting of said at least one MAC frame corresponding to said TCP packet.

21. A system for handling multimedia information in a communication system, the system comprising:
  a processor that is operable to determine a priority level of a transmission control protocol (TCP) packet based on information within said TCP packet;
  said processor is operable to determine a retransmission window time duration based on said determined priority level of said TCP packet;
  said processor is operable to assign one or more transmit antennas based on said determined priority level of said TCP packet for transmitting of at least one medium access control (MAC) frame corresponding to said TCP packet;
  said processor is operable to transmit at least MAC frame corresponding to said TCP packet within said determined retransmission window time duration; and
  when a timeout of a timer associated with said transmitting of said at least one MAC frame occurs at an end of said determined retransmission window time duration, said processor is operable to determine whether to retransmit said TCP packet based on said determined priority level of said TCP packet.

22. The system according to claim 21, wherein said processor is operable to instruct a TCP entity to cease attempts to retransmit said TCP packet subsequent to said retransmission window time duration associated with said transmitting of said at least one MAC frame based on said priority level of said TCP packet.

23. The system according to claim 22, wherein said processor is operable to instruct said TCP entity to stop a timer associated with said TCP packet.

24. The system according to claim 23, wherein said TCP entity continues to measure a time duration corresponding to at least one of a subsequent TCP packet and a previous TCP packet.

25. The system according to clam 22, wherein said TCP entity does not enter a slow start state based on failure to receive an acknowledgement in response to transmitting or retransmitting said TCP packet.

26. The system according to claim 21, wherein said processor is operable to perform at least one attempt to retransmit packet subsequent to said retransmission window time duration associated with said transmitting of said at least one MAC frame based on said priority level of said TCP packet.

27. The system according to claim 26, wherein said processor is operable to enter a slow start state based on failure to receive an acknowledgement in response to at least one transmitting or retransmitting said TCP packet.

28. The system according to claim 21, wherein said processor is operable to retransmit said at least one MAC frame when an acknowledgment for said transmitting is not received within an acknowledgment time duration following said transmitting.

29. The system according to claim 28, wherein said processor is operable to determine a maximum number of attempts for said retransmitting based on said retransmission window time duration.

30. The system according to claim 29, wherein said maximum number of attempts occurs within said retransmission window time duration associated with said transmitting of said at least one MAC frame corresponding to said TCP packet.

* * * * *

UNITED STATES PATENT AND TRADEMARK OFFICE
CERTIFICATE OF CORRECTION

| | | |
|---|---|---|
| PATENT NO. | : 8,411,581 B2 | |
| APPLICATION NO. | : 11/492381 | |
| DATED | : April 2, 2013 | |
| INVENTOR(S) | : Hooman Honary et al. | |

It is certified that error appears in the above-identified patent and that said Letters Patent is hereby corrected as shown below:

In the Claims

Col. 16, line 9, in claim 15: after "response to transmitting" delete "and"
Col. 16, line 53, in claim 21: after "transmit at least" insert --one--
Col. 18, line 1, in claim 27: after "in response to" delete "at least one"

Signed and Sealed this
Seventh Day of January, 2014

Margaret A. Focarino
*Commissioner for Patents of the United States Patent and Trademark Office*